(12) United States Patent
Taudt

(10) Patent No.: US 6,209,884 B1
(45) Date of Patent: Apr. 3, 2001

(54) RADIAL SEALING RING AND METHOD FOR PRODUCING IT

(75) Inventor: Christian Taudt, Winnenden (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/117,338

(22) PCT Filed: Jul. 1, 1997

(86) PCT No.: PCT/DE97/01376

§ 371 Date: Oct. 16, 1998

§ 102(e) Date: Oct. 16, 1998

(87) PCT Pub. No.: WO98/23885

PCT Pub. Date: Jun. 4, 1998

(30) Foreign Application Priority Data

Nov. 26, 1996 (DE) .............................................. 196 48 900

(51) Int. Cl.[7] .............................. F16L 5/02; F16L 17/06; F16J 15/08; B21D 53/84

(52) U.S. Cl. .......................... 277/607; 277/614; 277/626; 277/652; 29/888.3

(58) Field of Search .............................. 29/527.2, 527.4, 29/888.3; 417/423.14, 151; 277/608, 609, 607, 614, 626, 627, 651, 652; 427/430.1, 475, 421; 228/177, 262.41

(56) References Cited

U.S. PATENT DOCUMENTS

| 3,048,117 | * | 8/1962 | Franzen et al. | 417/423.14 |
|---|---|---|---|---|
| 3,221,661 | * | 12/1965 | Swearingen | 417/423.14 |
| 3,522,644 | * | 8/1970 | Cavagnero | 228/262.41 |
| 3,691,991 | * | 9/1972 | Luderer et al. | 427/475 |
| 3,838,495 | * | 10/1974 | Kuhnert | 29/527.2 |
| 3,881,338 | * | 5/1975 | Tischuk | 29/527.5 |
| 4,015,818 | * | 4/1977 | Tawakol | 277/651 |
| 4,072,088 | * | 2/1978 | Goloff | 277/189.5 |
| 4,428,588 | * | 1/1984 | Oelke | 277/83 |
| 4,685,620 | * | 8/1987 | Law et al. | 427/475 |
| 4,819,973 | * | 4/1989 | Pegon | 277/236 |
| 5,460,859 | * | 10/1995 | Reale | 427/430.1 |
| 5,486,010 | * | 1/1996 | Hamilton et al. | 277/229 |
| 5,706,787 | * | 1/1998 | Fujikawa | 277/213 |
| 5,997,008 | * | 12/1999 | Pflug | 277/627 |

* cited by examiner

*Primary Examiner*—Anthony Knight
*Assistant Examiner*—Vishal Patel
(74) *Attorney, Agent, or Firm*—Ronald E. Greigg; Edwin E. Greigg

(57) ABSTRACT

A safe mountability of a radial seating ring without mistakes, in which the radial sealing ring comprises a spring steel sheet, coated with an elastomer and having a cross section of undulating course, with at least one bulge pointing toward the interior of the sealing ring and at least one bulge pointing outward in the opposite direction, for contact with parts to be sealed off.

9 Claims, 1 Drawing Sheet

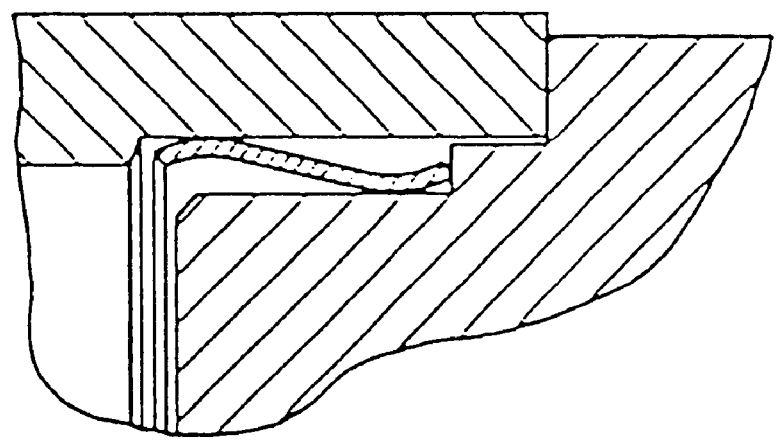
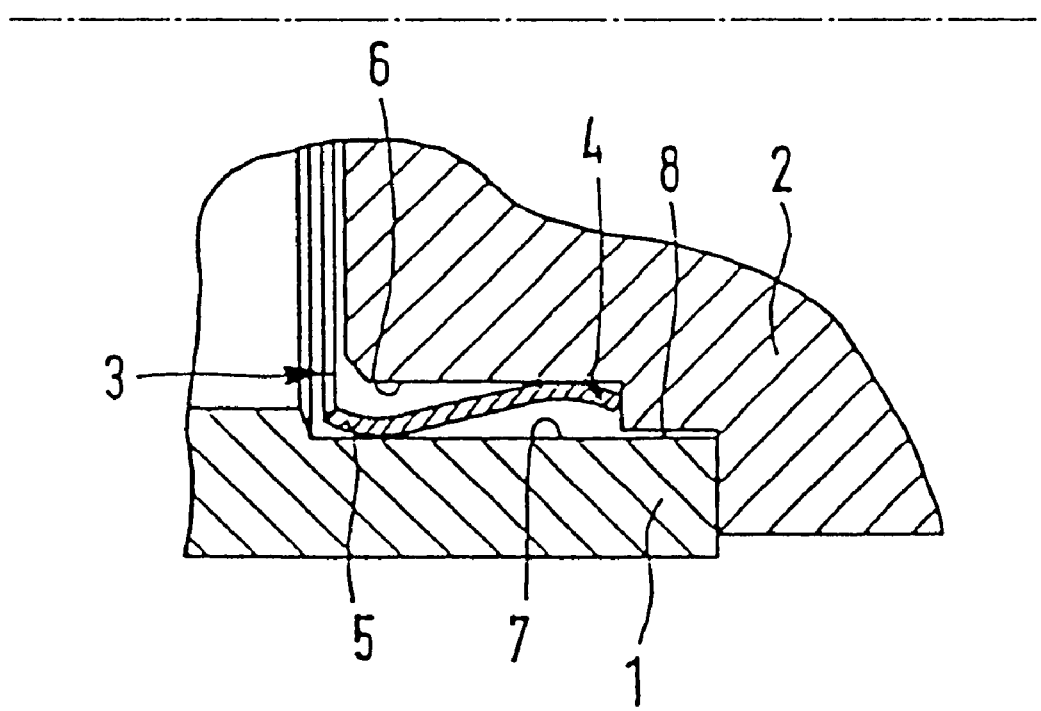

RADIAL SEALING RING AND METHOD FOR PRODUCING IT

PRIOR ART

The invention relates to a radial sealing ring as and to a method for producing the sealing ring. Known O-rings of this generic type do not offer optimal mounting safety, because they can become twisted or notched in the mounting process.

ADVANTAGES OF THE INVENTION

A radial sealing ring according to the invention has extremely high mounting safety; that is, damage when the sealing ring is mounted or inserted and when the parts to be sealed off from one another are connected damage is precluded.

At the parts to be sealed, simple annular shoulders that are mounted on ends adjoining one another act as the sealing faces. The radial fixation is accomplished via the closed ends of the radial annular shoulder portions, engaging one another from above or putting one inside the other, of the parts to be joined to one another tightly.

Centering of the parts to be joined tightly together via the seal of the invention is made possible by an embodiment set forth herein.

An expedient method for producing a sealing ring according to the invention is recited hereinafter.

BRIEF DESCRIPTION OF THE DRAWING

One exemplary embodiment is shown in the drawing, which shows a detail of a housing in section, with a housing opening closed with a stopper element.

DESCRIPTION OF AN EXEMPLARY EMBODIMENT

The opening of a housing 1 is tightly closed by a stopper element 2 with the interposition of a radial sealing ring 3.

The sealing ring 3 comprises a sheet of spring steel, shaped approximately as an S in cross section, which is curved to the desired diameter of the sealing ring and is welded at the abutting point. The spring steel sheet is coated with an elastomer. The production of the sealing ring 3 is done by shaping, rolling, welding, tempering and coating.

The cross-sectional shape, embodied approximately as an S, of the sealing ring 3 is such that the radially inward-pointing bulge 4 rests tightly against the radial sealing face of the annular shoulder 6 of the stopper element 2, and the radially outward-pointing bulge 5 rests sealingly against the sealing face of the annular shoulder 7, in each case with initial tension.

The annular shoulder 7 of the housing has an axial length that is greater than the width of the sealing ring 3. Because the sealing ring 3, in the position of the stopper element 2 when it is in its sealing function, in the opening of the housing 1 comes to rest in the axially closed end region of its annular shoulder 7, the remaining axial end portion on the axially open end of the annular shoulder 7 can be utilized for radial centering relative to an annular face 8 of the stopper element 2.

The foregoing relates to a preferred exemplary embodiment of the invention, it being understood that other variants and embodiments thereof are possible within the spirit and scope of the invention, the latter being defined by the appended claims.

What is claimed is:

1. A housing seal, when there is a stopper element (2) to be inserted into an opening of an injection pump housing (1) and having a radial seal, in which the radially opposed sealing faces of the housing (1) and of the stopper element (2), on their respective axially opposed ends, are radially indented annular shoulder segments (7) and (6), respectively, between whose axially closed ends a radial sealing ring (3) is axially fixed, said sealing ring comprises a spring steel sheet, coated with an elastomer, having a cross section which extends in undulating fashion, with at least one bulge (4) pointing toward an interior of the sealing ring and at least one bulge (5) pointing outward in an opposite direction, for contact with parts (1, 2) to be sealed off.

2. The housing seal according to claim 1, in which at least one of the two annular shoulder segments (6, 7) has an axial length extending beyond the width of the sealing ring (3), and as a result an axially open end region of this annular shoulder (6) and (7) enables radial centering relative to the part having the opposite annular shoulder (7) and (6), respectively.

3. A method for producing a sealing ring which comprises, shaping a cross-sectional profile of the sealing ring (3) into an untempered spring steel sheet to include butt ends, rolling the profiled spring steel sheet to a desired sealing ring diameter, welding the rolled spring steel sheet at the butt ends, tempering the sealing ring (3) of sheet spring steel, coating the sheet spring steel sealing ring (3) with an elastomer material.

4. The method according to claim 3, in which the coating is effected by dipping the shaped sealing ring (3) into an elastomer melt.

5. The method according to claim 4, in which for pretreatment for the coating, an adhesion promoter is applied to the shaped spring steel sheet welded to a sealing ring (3).

6. A method according to claim 3, in which the coating is effected by a spray process.

7. A method according to claim 3, in which the coating is effected electrostatically.

8. The method according to claim 6, in which for pretreatment for the coating, an adhesion promoter is applied to the shaped spring steel sheet welded to a sealing ring (3).

9. The method according to claim 7, in which for pretreatment for the coating, an adhesion promoter is applied to the shaped spring steel sheet welded to a sealing ring (3).

* * * * *